(12) United States Patent  (10) Patent No.: US 7,844,991 B1
Nakamura et al.  (45) Date of Patent: Nov. 30, 2010

(54) METHOD AND APPARATUS FOR DIGITAL SIGNAL PROCESSING

(75) Inventors: Masashi Nakamura, Chiba (JP); Hisayoshi Moriwaki, Tokyo (JP); Sunao Furui, Kanagawa (JP); Ichiro Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1293 days.

(21) Appl. No.: 09/889,380

(22) PCT Filed: Nov. 17, 2000

(86) PCT No.: PCT/JP00/08112

§ 371 (c)(1),
(2), (4) Date: Jul. 16, 2001

(87) PCT Pub. No.: WO01/37554

PCT Pub. Date: May 25, 2001

(30) Foreign Application Priority Data

Nov. 17, 1999 (JP) .................................. 11-327160

(51) Int. Cl.
*H04N 7/20* (2006.01)
(52) U.S. Cl. ........................... 725/80; 725/131; 348/553
(58) Field of Classification Search .................. 725/142, 725/131, 139, 151, 80
See application file for complete search history.

(56) References Cited

U.S. PATENT DOCUMENTS

| 5,367,571 | A | | 11/1994 | Bowen et al. | |
| 5,600,643 | A | | 2/1997 | Robrock, II | |
| 5,617,541 | A | * | 4/1997 | Albanese et al. | 709/207 |
| 5,619,250 | A | * | 4/1997 | McClellan et al. | 725/132 |
| 5,826,100 | A | | 10/1998 | Bonet et al. | |
| 5,838,383 | A | * | 11/1998 | Chimoto et al. | 348/553 |
| 6,041,035 | A | * | 3/2000 | Thedens | 370/217 |
| 6,198,479 | B1 | * | 3/2001 | Humpleman et al. | 715/733 |
| 6,340,997 | B1 | * | 1/2002 | Borseth | 348/731 |
| 6,343,379 | B1 | * | 1/2002 | Ozawa et al. | 725/63 |
| 6,469,742 | B1 | * | 10/2002 | Trovato et al. | 348/553 |
| 6,532,591 | B1 | * | 3/2003 | Arai et al. | 725/132 |
| 6,654,835 | B1 | * | 11/2003 | Foster et al. | 710/110 |
| 6,810,199 | B1 | * | 10/2004 | Horiguchi et al. | 386/83 |
| 2002/0047942 | A1 | * | 4/2002 | Vorenkamp et al. | 348/731 |
| 2003/0115612 | A1 | * | 6/2003 | Mao et al. | 725/136 |
| 2005/0204389 | A1 | * | 9/2005 | Proehl et al. | 725/60 |

FOREIGN PATENT DOCUMENTS

| EP | 0 700 205 | 3/1996 |
| EP | 0 862 327 | 9/1998 |
| EP | 0 910 208 | 4/1999 |

(Continued)

*Primary Examiner*—Annan Q Shang
(74) *Attorney, Agent, or Firm*—Frommer Lawrence & Haug LLP; William S. Frommer

(57) ABSTRACT

Elements necessary for a digital television receiver are structured as a plurality of digital signal processing blocks and a host operation processing block. The blocks are connected through a general-purpose bus. Command for controlling the operations of the blocks and data of streams are transferred through the bus. Thus, by replacing only blocks, various types of digital television broadcasts that differ in carrier waves, modulating systems, and compressing systems can be handled. Consequently, the developing efficiency of a television receiver is improved. In addition, when a new service is started, by adding hardware for the service, the service can be easily handled.

19 Claims, 13 Drawing Sheets

FOREIGN PATENT DOCUMENTS

| | | |
|---|---|---|
| EP | 1 146 736 | 10/2001 |
| JP | 5-284524 | 10/1993 |
| JP | 5 284524 | 10/1993 |
| JP | 8 79641 | 3/1996 |
| JP | 8-79641 | 3/1996 |
| JP | 9-503108 | 3/1997 |
| JP | 9 503108 | 3/1997 |
| JP | 10-174007 | 6/1998 |
| JP | 10 174007 | 6/1998 |
| JP | 10 232783 | 9/1998 |
| JP | 11 122550 | 4/1999 |
| JP | 11 312152 | 11/1999 |

* cited by examiner

METHOD AND APPARATUS FOR DIGITAL SIGNAL PROCESSING

TECHNICAL FIELD

The present invention relates to a digital signal processing apparatus, a system thereof, and an extension function providing method that are suitable for a digital broadcast receiving device that receives a satellite digital broadcast or a ground wave digital broadcast, in particular, to those that allow the receiving device to be effectively designed, easily design-changed, and easily applied for an added service and an improved function.

BACKGROUND ART

Analog television broadcasts are becoming changed to digital television broadcasts. So far, digital satellite broadcast services using CS (Communication Satellites) have been started. In addition, digital satellite broadcast services using BS (Broadcasting Satellites) are being prepared. Moreover, digital television broadcasts using ground waves are scheduled to be started.

In digital television broadcasts, since the frequency efficiency is improved, more channels can be assigned than analog television broadcasts. In addition, HDTV (High Definition Television) broadcasts can be easily performed. Moreover, in digital television broadcasts, various services such as bi-directional service, data delivery service, and video-on-demand that are not available in conventional analog television broadcasts can be accomplished.

A television receiver that receives such a digital television broadcast is conventionally structured as shown in FIG. 1.

In FIG. 1, a received signal is supplied from an input terminal 101 to a tuner circuit 102. In the case of a CS digital broadcast, a signal of 12 GHz band is received by a parabola antenna (not shown). The received signal is converted into a signal of 1 GHz band by a low noise converter disposed in the parabola antenna. The converted signal is supplied to the tuner circuit 102. The tuner circuit 102 selects a carrier frequency signal of a desired channel from the received signal and performs a demodulating process and an error correcting process for the selected signal. As a result, the tuner circuit 102 decodes the selected signal to a transport stream composed of video packets and audio packets.

An output of the tuner circuit 102 is supplied to a demultiplexer 103. The demultiplexer 103 separates the transport stream into video packets and audio packets.

The video packets are supplied to a video decoder 104. The audio packets are supplied to an audio decoder 105. The video decoder 104 performs a decompressing process for the video packets corresponding to for example the MPEG 2 (Moving Picture Experts Group) system so as to decode the video packets to video data. In addition, the audio decoder 105 performs a decompressing process for the audio packets corresponding to the MPEG system so as to decode the audio packets to audio data.

The video data decoded by the video decoder 104 is supplied to a graphics processing circuit 106. The graphics processing circuit 106 performs a picture process. An output of the graphics processing circuit 106 is output from an output terminal 107. An output of the audio decoder 105 is output from an output terminal 108.

The tuner circuit 102, the demultiplexer 103, the video decoder 104, the audio decoder 105, and the graphics processing circuit 106 are controlled by an MPU (Micro Processor Unit) 111. A bus 110 extends from the MPU 111. The tuner circuit 102, the demultiplexer 103, the video decoder 104, the audio decoder 105, and the graphics processing circuit 106 are connected to the bus 110.

In addition, a modem 112 and for example an IEEE (Institute of Electrical and Electronics Engineers) 1394 interface 113 are connected to the bus 110. The modem 112 is used to perform a charging process. The IEEE 1394 interface 113 exchanges a stream with an external device.

As was described above, in a conventional receiver for a digital television broadcast, the entire receiver is controlled by an MPU. The MPU centrally controls each portion of hardware using commands thereof in consideration of precise timing levels thereof.

However, in that method of which the MPU centrally controls the entire device in consideration of each portion of the hardware, since the design work should be performed for each device, if the design of the device is changed, software should be largely rewritten and hardware should be largely changed. Thus, the developing efficiency of such a method is low. In addition, since parts cannot be used in common or structured as modules, the cost of the device may rise. In addition, the size of the device may become large. Moreover, digital television broadcasts provide various types of services. Thus, in the method of which the MPU centrally manages the entire device, it is difficult to deal with new services.

Thus, functions necessary for a television receiver may be structured as blocks and connected through a common bus. For conventional television receivers, a standardized controlling bus has been proposed.

However, the conventional controlling bus is used to exchange control data among the MPU and the individual blocks. Thus, streams of video data and audio data are not sent to the bus. In a digital television broadcast, since streams of video data and audio data should be processed, the conventional bus that exchanges only control data cannot be used.

Although a bus for control data and another bus for streams of video data and audio data may be separately disposed, streams and control data should be synchronized. To do that, a timing signal is required. When the timing signal is sent, the buses depend on hardware. Thus, a general-purpose designing method cannot be used.

On the other hand, in personal computers, there are standardized buses such as PCI (Peripheral Component Interconnect) and ISA (Industry Standard Architecture). Like personal computers, in television receivers for digital television broadcasts, it is likely that a standardized bus is required.

However, in personal computers, when hardware for a new function is connected to a bus, software of a driver for the hardware should be installed. Thus, the user should perform the installing operation for the software.

When a digital television broadcast is processed, streams of video data and audio data that are transferred at high speed should be processed. However, when a personal computer handles such streams, a high speed CPU and a large capacity memory are required.

Therefore, an object of the present invention is to provide a digital signal processing apparatus and a receiving method that allow the developing efficiency to be improved and the design to be easily changed.

Another object of the present invention is to provide a digital signal processing apparatus and a method that allow a new service and a change of a broadcasting system to be easily handled.

DISCLOSURE OF THE INVENTION

The present invention is a digital signal processing apparatus, comprising:

a plurality of digital signal processing blocks and a host arithmetic operation processing block as functions necessary for processing a digital signal; and a bus for connecting the host arithmetic operation processing block and the plurality of digital signal processing blocks, wherein commands for controlling the operations of each of the blocks and data of streams are transferred through the bus.

The present invention is a digital signal processing method, comprising the steps of:

structuring functions necessary for processing a digital signal as a plurality of digital signal processing blocks and a host arithmetic operation processing block; and connecting the host arithmetic operation processing block and the plurality of digital signal processing blocks through a bus, wherein commands for controlling the operations of each of the blocks and data of streams are transferred through the bus.

Elements necessary for a digital television receiver are structured as blocks and connected through a general-purpose bus. Thus, by replacing only blocks, various types of digital television broadcasts that differ in carrier waves, modulating systems, and compressing systems can be handled. Thus, the developing efficiency is improved. In addition, when a new service is started, by adding hardware, the service can be easily handled.

BEST MODES FOR CARRYING OUT THE INVENTION

Next, with reference to the accompanying drawings, an embodiment of the present invention will be described. According to the embodiment of the present invention, a digital television receiver is structured in such a manner that elements necessary for the digital television receiver are structured as blocks and connected through a bus.

When elements necessary for a digital television receiver are structured as blocks and connected through a bus, various types of digital television broadcasts that vary in carrier waves, modulating systems, and compressing systems can be handled. Thus, the developing efficiency of digital television receivers is improved. In addition, when a new service is started, by adding hardware for the service, the device can easily handle the service.

Figure 1:
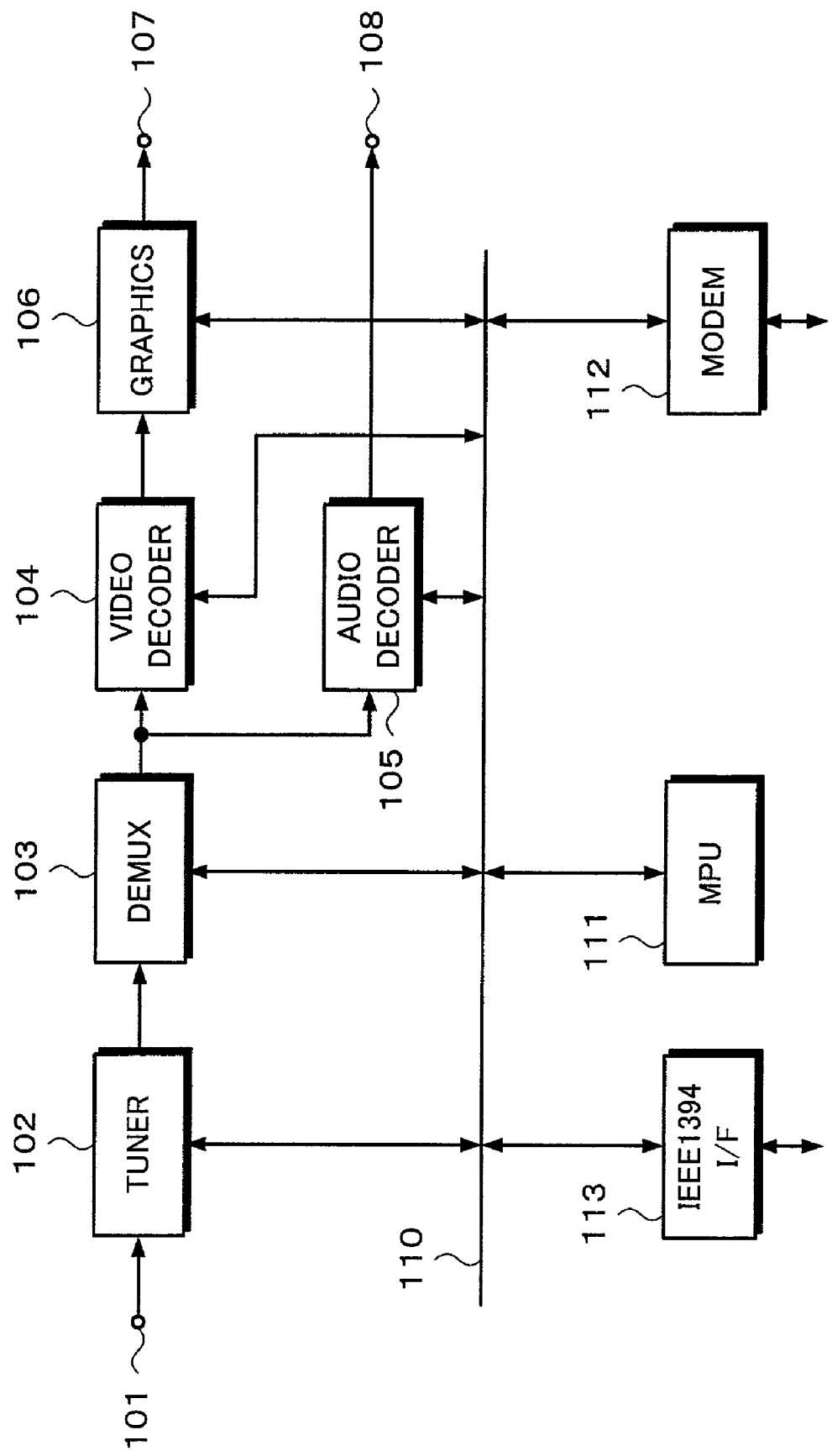
FIG. 1 is a block diagram showing an example of a conventional receiving device for a digital television broadcast.
Figure 2:
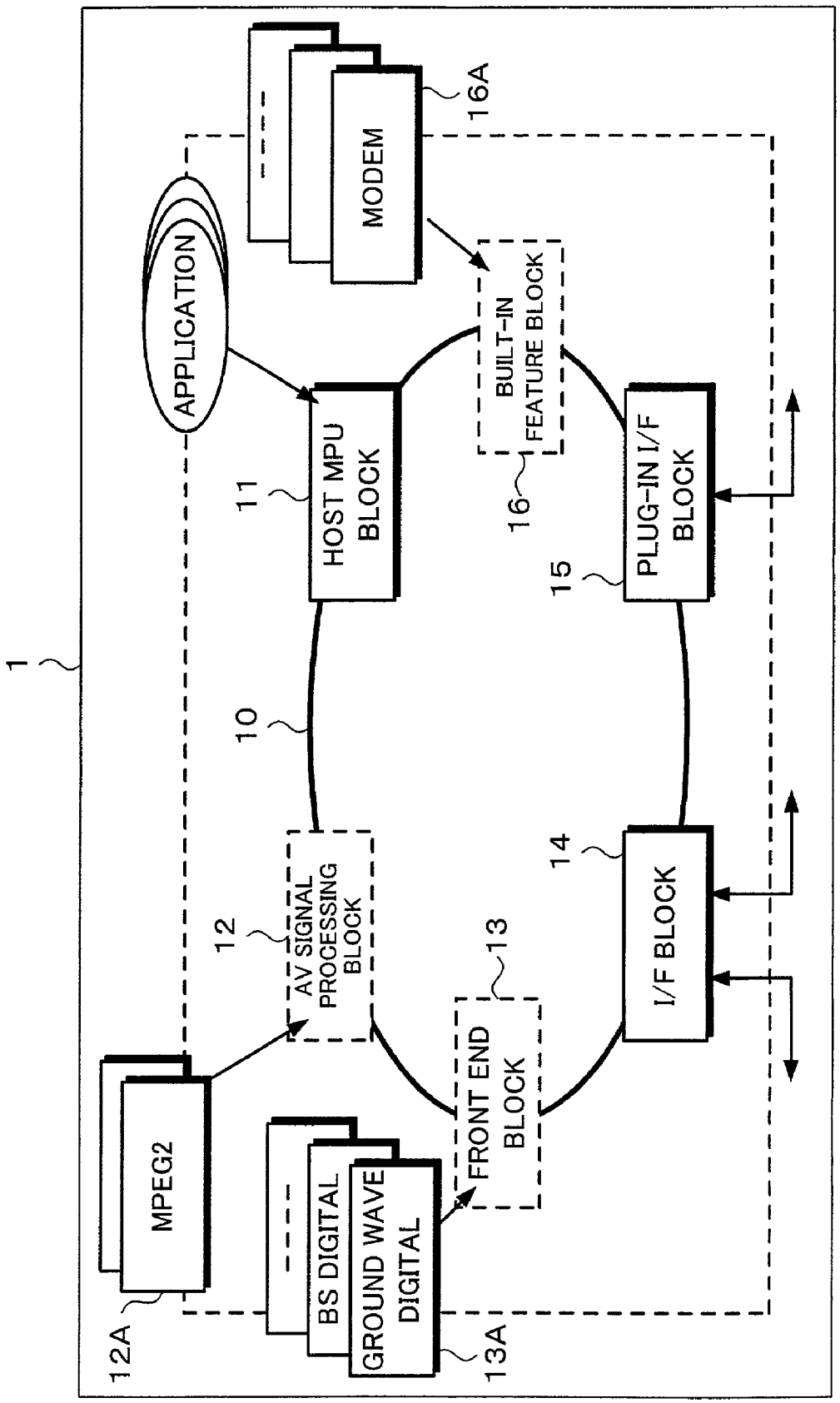
FIG. 2 is a block diagram for explaining the basic structure of the present invention.

FIG. 2 shows the basic structure of a digital television receiver of which elements necessary for the receiver are structured as blocks and connected through a bus.

In FIG. 2, a digital television receiver 1 is structured in such a manner that blocks 11, 12, 13, 14, 15, and 16 necessary for the digital television receiver 1 are connected to a bus 10. The blocks 11, 12, 13, 14, 15, and 16 necessary for the digital television receiver are a host MPU block 11, an AV signal processing block 12, a front end block 13, an interface block 14, a plug-in interface block 15, and a built-in feature block 16 that are connected to the bus 10.

The host MPU block 11 controls the entire receiver. The AV signal processing block 12 performs a decompressing process for a video stream and an audio stream and a graphic process. The front end block 13 selects a carrier wave signal of a desired channel from a received television broadcast and performs a demodulating process, an error correcting process, and so forth for the selected signal so as to decode the video stream and the audio stream. The interface block 14 is an interface such as the IEEE 1394 interface for connecting the receiver with an external device. The plug-in interface block 15 is an interface for connecting the receiver with hardware for an extension function. The built-in feature block 16 accomplishes a required built-in function.

Chronological successive streams of video data and audio data, commands, and data are transferred to the bus 10. The commands are high level layer that are not on real time basis and that do not depend on hardware structure, not low level layer commands for directly controlling hardware. For example, a command "Receive a frequency of X channel." is issued to the front end block 13. Those commands are also general-purpose script type commands such as "Enlarge (or reduce) the screen." or "Draw a circle." that are issued to the AV signal processing block 12.

When a script is described with hypertext, such operations can be easily accomplished.

Figure 3:
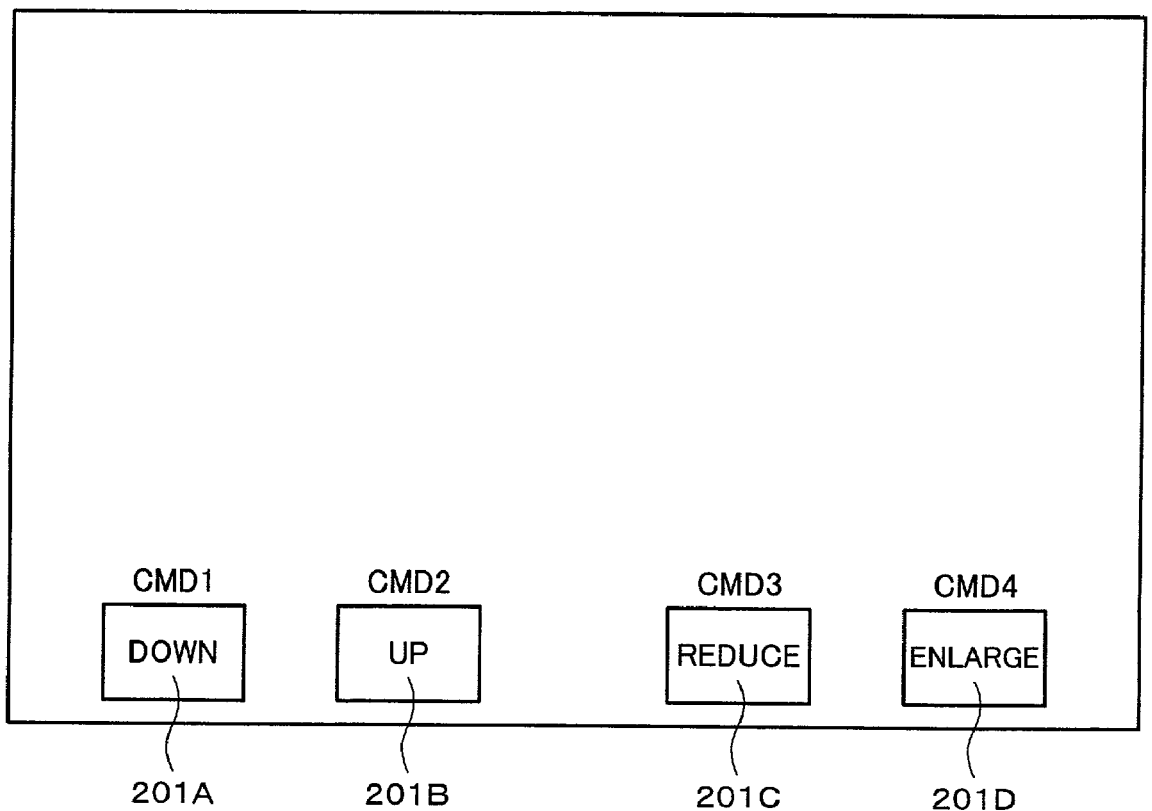
FIG. 3 is a schematic diagram for explaining generations of commands and a screen display.

In other words, as shown in FIG. 3, a script of which up-down keys 201A and 201B and enlarge-reduce keys 201C and 201D are displayed and commands CMD1 to CMD4 corresponding to the indications 201A to 201D are embedded is created with hypertext. When such a script is displayed, a screen shown in FIG. 3 is displayed on a screen of a browser. When the indications 201A to 201D for the channel up-down buttons and screen enlarged-reduce buttons are clicked, commands CMD1 to CMD4 corresponding thereto are generated. The commands are sent to the relevant blocks 11 to 16. When a block receives such a command, the block performs a process corresponding to the command. To cause each block to perform a more complicated process, JAVA or the like can be used.

Of course, the present invention is not limited to the use of hypertext and JAVA.

The physical structure of the bus 10 is standardized. The blocks 11, 12, 13, 14, 15, and 16 are designed so that they comply with the standardized bus. Basic blocks such as the host MPU block 11, the interface block 14, and the plug-in interface block 15 may be disposed on a mother board. The other blocks 12, 13, and 16 may be disposed on a daughter board. The blocks 12, 13, and 16 may be connected to the standardized bus. Alternatively, the individual blocks 11, 12, 13, 14, 15, and 16 may be structured as integrated circuits or modules.

In the above example, the receiver is divided into the host MPU block 11, the AV signal processing block 12, the front end block 13, the interface block 14, the plug-in interface block 15, and the built-in feature block 16. However, it should be noted that the dividing method is not limited to such an example.

Of course, when each block is disposed on a board, one block is not always composed of one board. In other words, two or more functional blocks may be disposed on one board. For example, the host MPU block 11 and the interface block 14 may be disposed on one board. Of course, one block may be composed of a plurality of boards.

Each of the block 11, 12, 13, 14, 15, and 16 interprets a command received through the bus 10, executes a process corresponding to the command, and processes a stream and data received through the bus 10.

Since a command that does not largely depend on hardware is received through the bus 10, each of the blocks 12, 13, 14, 15, and 16 has a CPU (Central Processing Unit) in many cases so as to interpret the received command and process it. The CPU of each of the blocks 12, 13, 14, 15, and 16 interprets a received command and executes a process corresponding to the command. Each of the blocks 12, 13, 14, 15, and 16 has a driver that operates hardware corresponding to the received command. A portion that largely depends on hardware completes a process in the block thereof.

Figure 4:
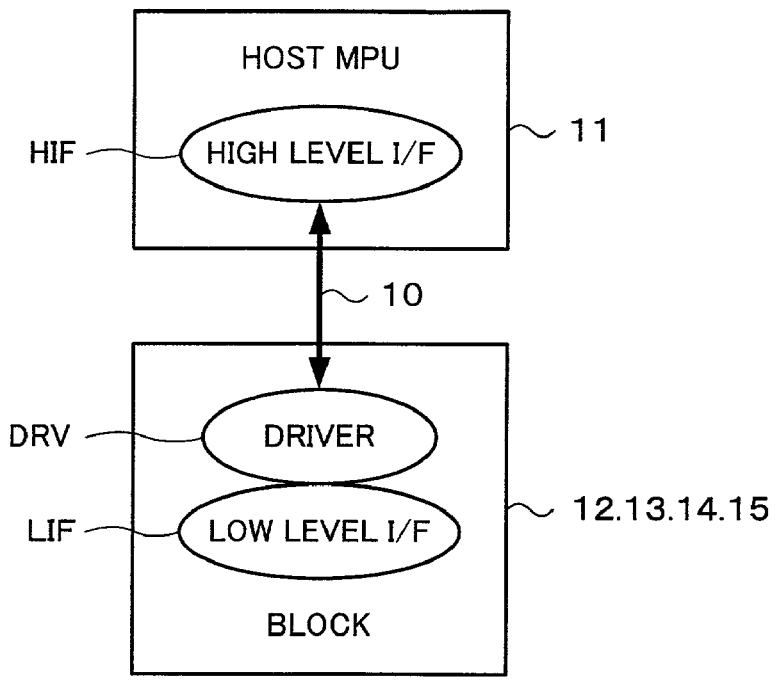
FIG. 4 is a schematic diagram for explaining a command sent from a host processor.

In other words, as shown in a conceptual diagram shown in FIG. 4, the host MPU block 11 side has a high level interface HIF for a process with a high level command that is a general purpose command and that does not depend on hardware. On the other hand, each of the blocks 12, 13, 14, and 15 side has a driver DRV that interprets a high level command and performs a process that more depends on hardware and a low level interface LIF that directly controls the hardware.

The host MPU block 11 side sends a high level command through the high level interface HIF and transfers it to each block through the bus 10. The driver DRV of each block interprets a high level command. In that case, portions that depend on hardware are handled by the driver DRV of each of the blocks 12, 13, 14, and 15.

Figure 5:
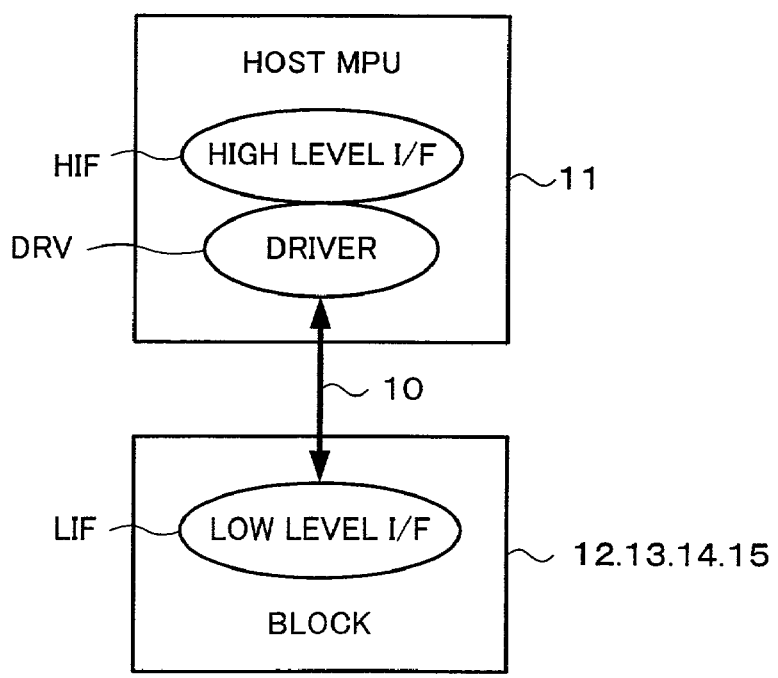
FIG. 5 is a schematic diagram for explaining a command sent from the host processor.

On the other hand, as shown in FIG. 5, the host MPU block 11 side may have a driver DRV. However, in the case shown in FIG. 5, when new hardware is added or hardware is changed, a new driver DRV should be installed or the existing driver DRV should be changed.

High speed streams such as streams of video data and audio data and data that is not on real time basis such as commands and data are transferred to the bus 10. A bus that can transfer different types of data may have two bands that are a band for a high speed stream such as video data and audio data and a band for data that is not on real time basis such as commands. Alternatively, data may be assigned priority in such a manner that streams of video data and audio data are assigned high priority so that the streams of video data and audio data are transmitted at high speed.

A command that is transmitted to the bus 10 is for example a script type command that is not on real time basis unlike a timing control command. Thus, the data amount of a command that is sent can be remarkably suppressed. Consequently, the same bus 10 can send both commands and streams of video data and audio data.

In such a manner, the digital television receiver is structured in such a manner that the individual blocks 11, 12, 13, 14, 15, and 16 are connected through the bus 10 and commands, streams, and data are exchanged through the bus 10. Thus, the digital television receiver can easily handle various types of television broadcasts. Consequently, the developing environment of the receiver is remarkably improved.

For example, when a ground wave digital broadcast is started, a television receiver that receives it should be newly developed. However, when the receiver is designed from the beginning as the service the ground wave digital broadcast is started, the developing efficiency of the receiver becomes low.

Although the carrier frequency, modulating system, error correcting system, transport stream structure, and so forth of the conventional digital satellite broadcasts are different from those of ground wave digital broadcasts, when other systems of the conventional digital satellite broadcasts are the same as those of the ground wave digital broadcasts, only the AV signal processing block 12 and the front end block 13 for the ground wave digital broadcasts can be developed. In that case, as the services of the ground wave digital broadcasts are started, an AV signal processing block 12A for ground wave digital broadcasts and a front end block 13A for ground wave digital broadcasts are developed. When only the AV signal processing block 12 and the front end block 13 are substituted with the AV signal processing block 12A and the front end block 13A, respectively, the television receiver can handle the ground wave digital broadcasts that will be newly started. Thus, it is not necessary to develop a receiver for ground wave digital broadcasts from the beginning. Even if particular portions for ground wave digital broadcasts are required, only those portions can be newly developed. In addition, the operation of the receiver can be changed by changing the application program of the host MPU block 11.

Likewise, receivers for digital television broadcasts through satellites in European countries and receivers for digital television broadcasts of US CATV stations can be easily developed without need to newly design those receivers from the beginning.

In CS digital broadcasts, a television receiver has a modem that is used for a charging process and that is connected to a management company through a telephone line. In such a case, a modem 16A is disposed as the built-in feature 16. Thus, a device necessary for receiving such a broadcast service can be easily mounted as the built-in feature block 16.

In addition, a music data downloading service, a video-on-demand service, and other services are expected. To receive a new service, hardware may be added. In that case, the hardware is added as a device attached to the plug-in interface block 15.

When a block is replaced with another one or when a new device is attached to the plug-in interface block 15, a driver thereof may be required. In such a case, the driver may be stored in a memory of the block or a memory of the device attached to the plug-in interface block 15. When the block is replaced or the device is attached to the plug-in interface block 15, the driver may be automatically installed. In that case, the operability is improved.

Figure 6:
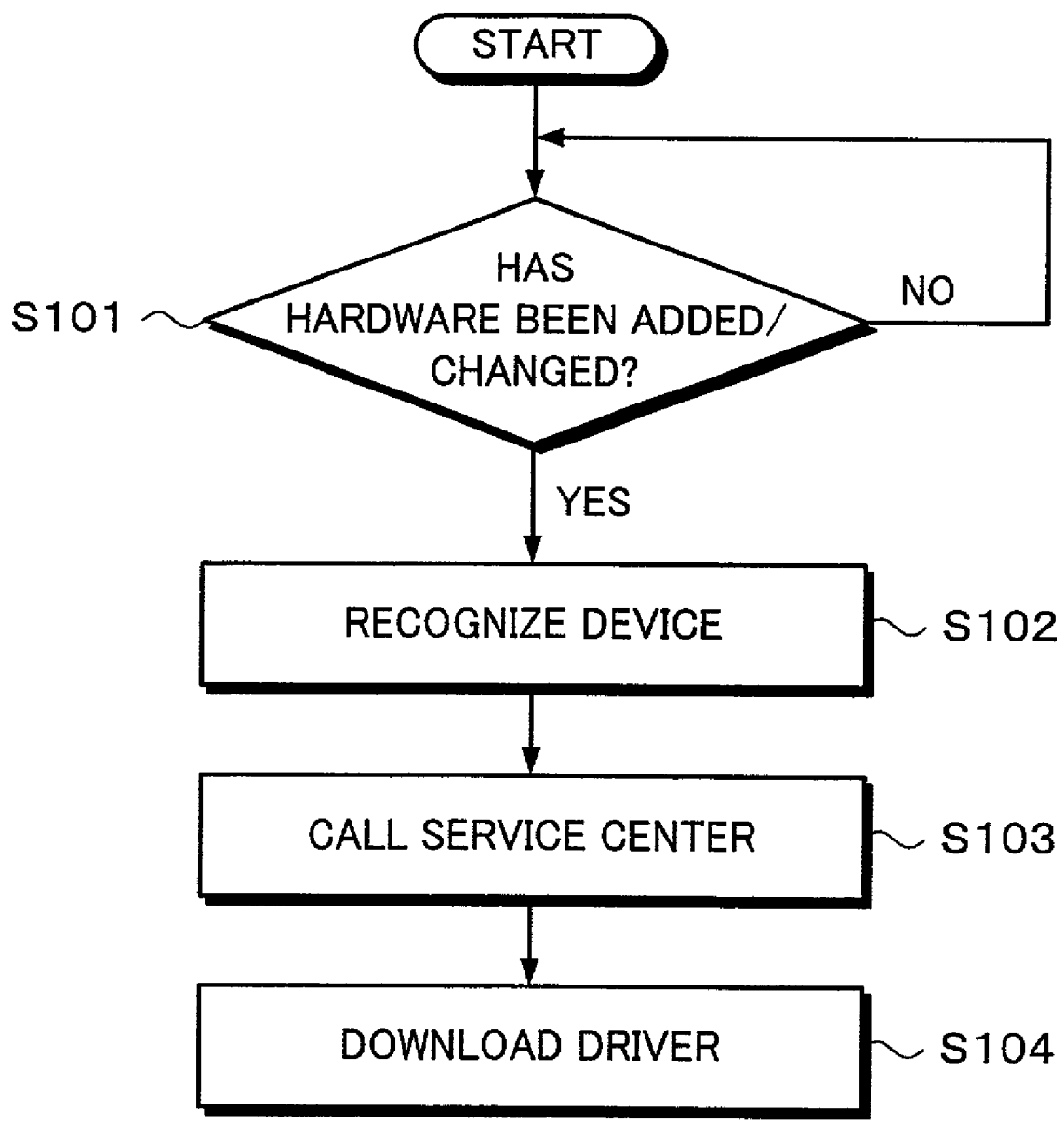
FIG. 6 is a flow chart for explaining the case that a driver is installed.

In addition, as shown in FIG. 6, when a block is replaced or when a device is attached to the plug-in interface block 15, a service center may be called and a relevant driver may be downloaded therefrom.

In other words, as shown in FIG. 6, it is determined whether a block has been replaced or a new device has been attached to the plug-in interface block 15 (at step S101). When a block has been replaced or a new device has been attached to the plug-in interface block 15, the replaced device or the new device is recognized (at step S102). Thereafter, the service center is called by a telephone (at step S103). When the service center is called, software of the driver corresponding to the recognized device is transmitted through the telephone line. As a result, the software of the driver is downloaded (at step S104).

Alternatively, software of the driver may be downloaded with a digital satellite broadcast signal or a digital ground wave broadcast signal.

Of course, only when each block requires a driver as shown in FIG. 4, the driver should be installed. Thus, when commands for individual blocks are high layer commands, it is not necessary to install a driver. However, in that case, when software of a portion that depends on hardware is changed, it may be necessary to install a relevant driver.

As described above, digital television broadcasts are performed through various transmission mediums such as a satellite, a ground wave, a CATV network, and a television line. Carrier waves, modulating systems, and compressing systems used for digital television broadcasts vary depending on transmission mediums, countries and areas, broadcasting companies, and so forth. In addition, in digital television broadcasts, various services such as HDTV broadcast, data delivery service, and video-on-demand service are expected. Thus, receivers for digital television broadcasts corresponding to various transmission mediums, areas, services, and so forth should be developed.

As described above, blocks that accomplish individual functions of a television receiver are connected to a standardized bus. Streams of video data and audio data and commands are exchanged through the standardized bus. In that case, the developing efficiency of television receivers is improved. In addition, various types of television receivers can easily handle services that will be newly started.

Figure 7:
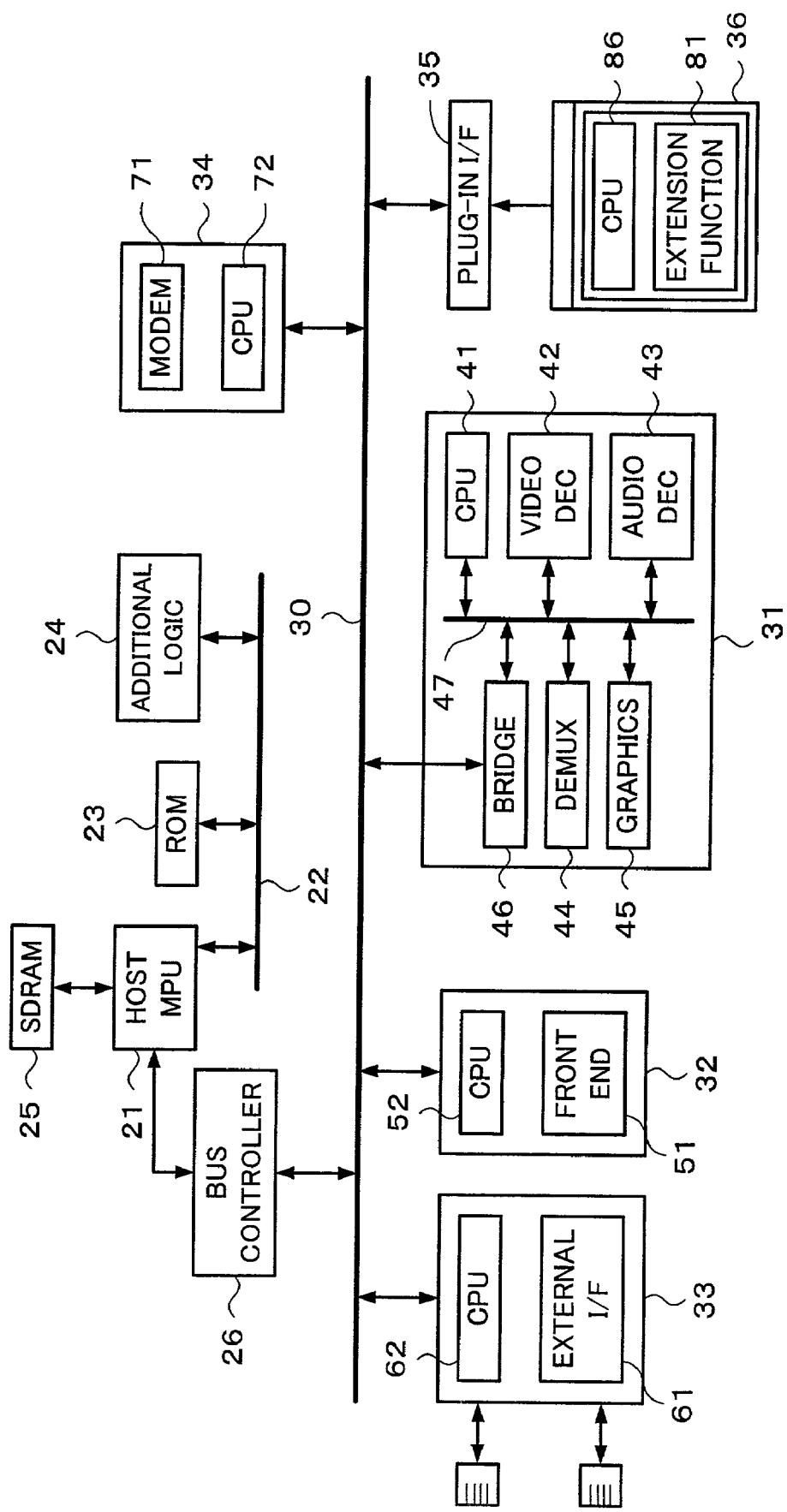
FIG. 7 is a block diagram showing an example of a television receiver according to the present invention.

FIG. 7 shows an example of the real structure of such a television receiver. In FIG. 7, an internal bus 22 extends from a host MPU 21. A ROM (Read Only Memory) 23 is connected to the bus 22. An additional logic 24 is connected to the internal bus 22 so as to extend a function.

The ROM 23 stores an application program for operating the entire television receiver. An SDRAM 25 is connected to the host CPU 21. The SDRAM 25 stores user's personal information and various types of setting information. The host CPU 21 is connected to a bus 30 through a bus controller 26.

The bus 30 is used to transmit streams of video data and audio data that are chronologically successive data and commands and data. The commands are high layer commands that do not depend on hardware and that are not on real time basis.

An AV signal processing block 31, a front end block 32, an external interface block 33, and a built-in feature block 34 are connected to the bus 30. In addition, the bus 30 has a plug-in interface 35. An extension plug-in card 36 can be attached to the plug-in interface 35.

A portion composed of the host MPU 21 may be disposed on a mother board. Each of the blocks 31, 32, 33, and 34 may be disposed on a daughter board. The shapes and terminal positions of the mother board and the daughter board may be pre-designated so that the daughter boards of the blocks 31, 32, 33, and 34 may be attached and detached to/from the mother board of the host MPU 21. Alternatively, the blocks 31, 32, 33, and 34 may be structured as blocks or integrated circuits.

Data transferred among the host MPU 21, the blocks 31, 32, 33, and 34, and the extension plug-in card 36 through the bus 30 is managed by the bus controller 26. Alternatively, data may be directly transferred among the blocks 31, 32, 33, and 34 and the extension plug-in card 36 not through the host MPU 21 by the DMA (Direct Memory Access) control.

Data can be transferred from one block to one block. Alternatively, data can be transferred from one block to a plurality of blocks. In other words, data can be broadcast. The broadcast transferring operation can be used when a transport stream received from the front end block 32 is transmitted to the AV signal processing block 31 and the external interface block 33 at the same time so that while a picture is being reproduced, the transport stream can be transmitted to a device connected to the external interface block 33.

The AV signal processing block 31 extracts video packets and audio packets from the transport stream and decompresses the video packets and audio packets to original video data and audio data. The AV signal processing block 31 can perform a picture process for the decoded video data.

The AV signal processing block 31 has a CPU 41, a video decoder 42, an audio decoder 43, a demultiplexer 44, a graphics processing circuit 45, and a bridge circuit 46. The CPU 41, the video decoder 42, the audio decoder 43, the demultiplexer 44, the graphics processing circuit 45, and the bridge circuit 46 are connected to an in-chip bus 47.

The front end block 32 selects a desired carrier wave signal from the received signal, demodulates the selected carrier wave signal, performs an error correcting process for the demodulated signal, and outputs a transport stream. The front end block 32 has a front end pack 51 and a CPU 52. The front end pack 51 has a mixer circuit, a local oscillating circuit, an intermediate frequency amplifying circuit, a demodulating circuit, an error correcting circuit, and so forth that convert the received signal into an intermediate frequency signal.

The interface block 33 provides an interface with an external device corresponding to for example the IEEE 1394 standard. The external interface block 33 has an interface 61 corresponding to for example the IEEE 1394 standard and a CPU 62.

The built-in feature block 34 is used to provide an addition circuit necessary for receiving a digital broadcast. In a digital broadcast, received data is transferred through a telephone line so as to perform a charging process. To do that, a modem is disposed in the built-in feature block 34. The built-in feature block 34 has a circuit 71 that accomplishes an additional function (in this case, a modem) and a CPU 72.

The plug-in interface 35 provides an extension function for receiving a new service. The extension plug-in card 36 is attached to the plug-in interface 35. The extends on plug-in card 36 has an extension function 81 and a CPU 86. The extension function 81 is composed of software and hardware that accomplish an extension function.

The structure shown in FIG. 7 composes a television receiver 20 that receives for example a digital CS broadcast. In that case, the front end block 32 that performs the QPSK demodulating process, the Viterbi decoding process, and the Reed-Solomon code error correcting process is used. The AV signal processing block 31 that decompresses video packets of transport streams compressed corresponding to the MPEG 2 system and audio packets compressed corresponding to the MPEG system is used.

In a digital CS broadcast, for example, a signal of 12 GHz band is used. A received signal of 12 GHz band transmitted from a satellite is received by a parabola antenna (not shown). The received signal is converted into a signal of around 1 GHz by a low noise converter disposed in the parabola antenna and sent to the front end block 32. The front end block 32 selects a carrier wave signal of a desired channel from the received signal. The front end block 32 performs the QPSK demodulating process, the Viterbi decoding process, and the Reed-Solomon code error correcting process for the signal so as to decode the received signal to the transport stream.

At that point, the received channel is selected corresponding to a command sent from the host MPU 21 through the bus 30. The host MPU 21 sends a high layer command such as "Receive a frequency of X channel." through the bus 30. The command is sent from the bus 30 to the CPU 52 of the front end block 32. The CPU 52 interprets the command and generates a control signal for designating the received frequency to a desired carrier wave frequency corresponding to the command. In reality, the CPU 52 generates a control signal of the PLL that composes the local oscillator. As a result, the frequency of the received channel is designated.

The front end block 32 outputs a transport stream of packets of video data compressed corresponding to the MPEG 2 system and packets of audio data compressed corresponding to the MPEG system. The transport stream is sent to the AV signal processing block 31 through the bus 30. Thereafter, the transport stream is sent from the AV signal processing block 31 to the demultiplexer 44 through the bridge 46 and the in-chip bus 47. The demultiplexer 44 separates the transport stream into video packets and audio packets. The video packets are sent to the video decoder 42. The audio packets are sent to the audio decoder 43. The video decoder 42 performs the decompressing process for the video data compressed corresponding to the MPEG 2 system so as to decode the video data. The audio decoder 43 performs the decompressing process for the audio data compressed corresponding to the MPEG audio system so as to decode the audio data. The video data decoded by the video decoder 42 is sent to the graphics processing circuit 45 through the in-chip bus 47. The graphics processing circuit 45 performs the picture process for the video data.

The picture process performed by the graphics processing circuit 45 depends on a command received from the host MPU 21 through the bus 30. A high layer command for example "Reduce (or enlarge) the screen." is sent from the host MPU 21 through the bus 30. The command is sent from the bus 30 to the CPU 41 through the bridge circuit 46. The CPU 41 interprets the command and generates a control signal for reducing/enlarging the screen in the designated size corresponding to the command. In reality, the CPU 41 sends a timing signal for reducing or enlarging the screen and a command for directly controlling hardware to the graphics processing circuit 45 corresponding to the received high layer command.

Thus, in that example, the individual functions necessary for structuring the television receiver 20 are connected as the blocks 31, 32, 33, 34, and 35 to the bus 30. Commands and streams are transferred through the bus 30. When the bus 30 is standardized, the developing efficiency of a television receiver is improved. Thus, a television receiver corresponding to a change of a broadcasting system, a change of a service, or an addition of a service can be easily developed.

However, in that case, since streams composed of video packets and audio packets are directly transferred to the bus 30. Thus, an external device may be connected to the bus 30 so as to extract video packets and audio packets sent through the bus 30 and copy them to the device. When the bus 30 is standardized, there is a risk of which a device that is connected to the bus 30 and that extracts video packets and audio packets sent through the bus 30 is easily accomplished.

Figure 8:
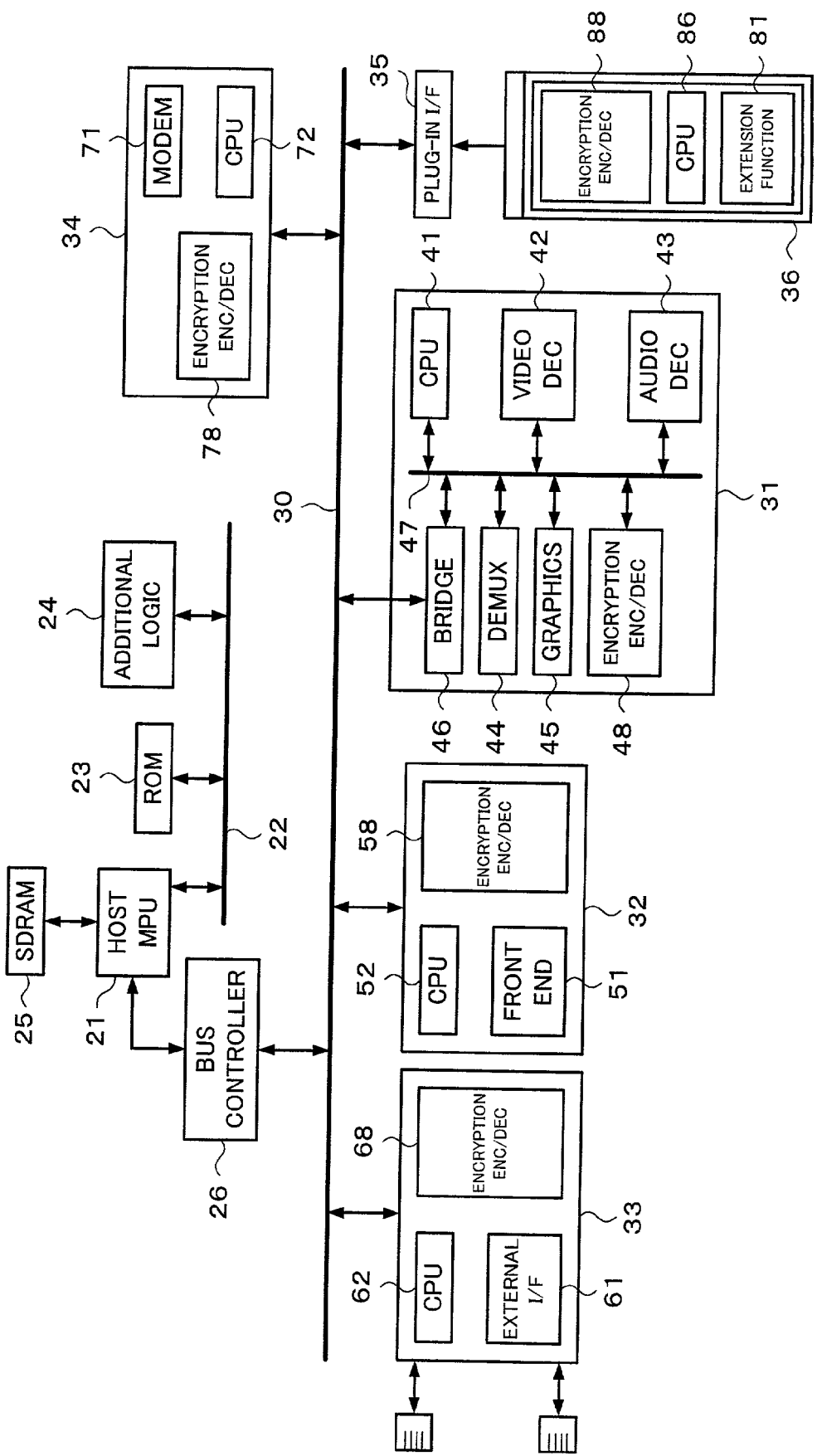
FIG. 8 is a block diagram showing an example of an encrypting process performed in the television receiver according to the present invention.

To protect contents, as shown in FIG. 8, encryption encoders/decoders 48, 58, 68, 78, and 88 are disposed in the blocks 31, 32, 33, 34, and 35, and the extension plug-in card 36 connected to the bus 30, respectively.

The encryption encoders/decoders 48, 58, 68, 78, and 88 encode streams of video packets and audio packets transferred from the blocks 31, 32, 33, 34, and 35 through the bus 30. Since streams of video packets and audio packets transferred through the bus 30 are encrypted in such a manner, the contents can be protected.

In that example, to protect contents that flow on the bus 30, the encryption encoders/decoders 48, 58, 68, 78, and 88 are disposed in the blocks 31, 32, 33, and 34, and the extension plug-in card 36, respectively. However, since the blocks 31, 32, 33, and 34 are housed in the set of the receiver, the risk of which contents are leaked out from the blocks 31, 32, 33, and 34 is relatively low. On the other hand, the bus 30 extends from the plug-in interface 35 to the outside. When a device that copies data is connected to the plug-in interface 35 and contents are extracted from the bus 30, the risk of which the contents are leaked out becomes the highest.

Figure 9:
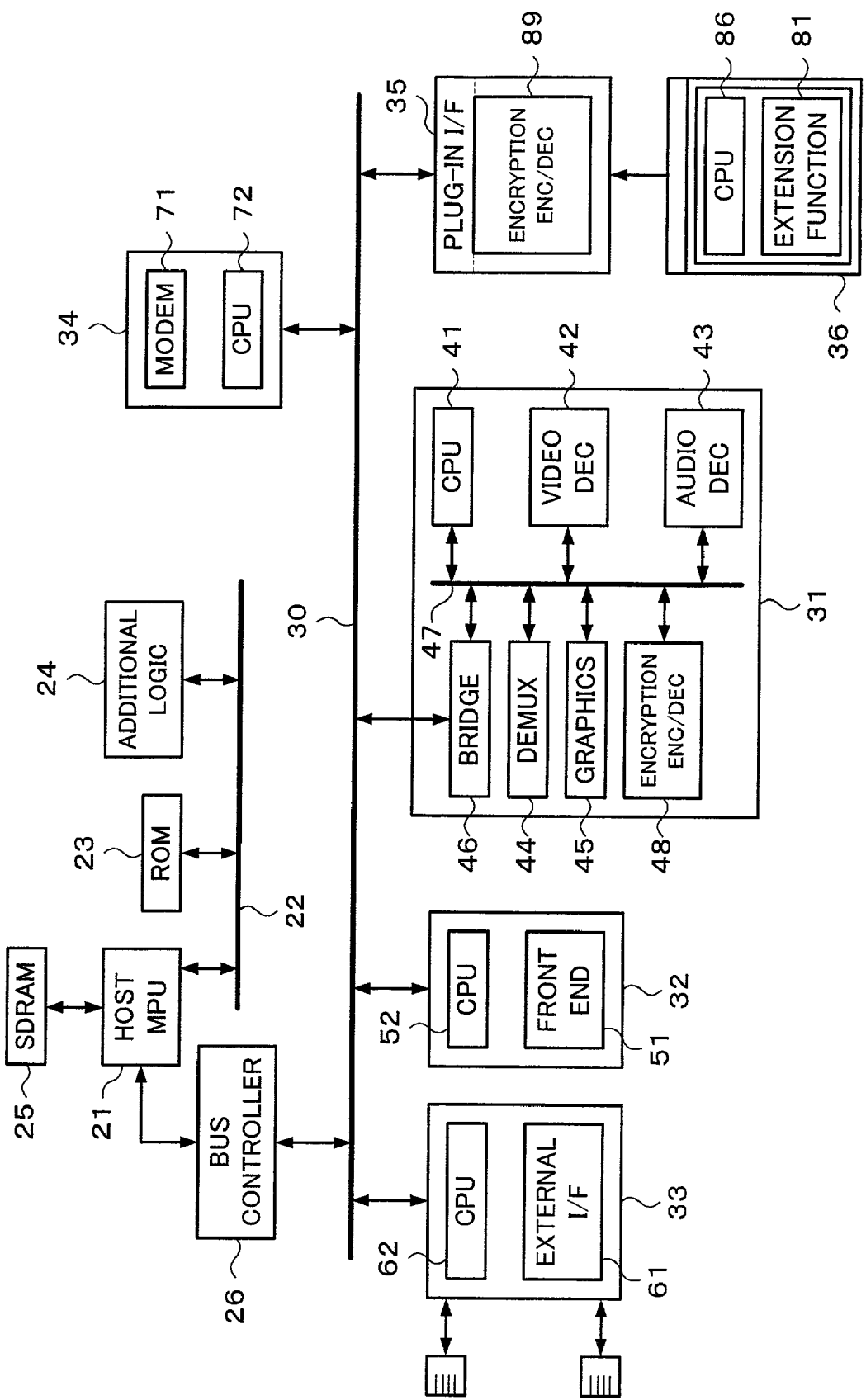
FIG. 9 is a block diagram showing another example of the encrypting process performed in the television receiver according to the present invention.

To prevent that, as shown in FIG. 9, an encoding encoder/decoder 89 may be disposed in the plug-in interface 35 so that data of contents that flow on the bus 30 is not leaked out from the plug-in interface 35.

In the television receiver 20 according to the present invention, when the extension plug-in card 36 is attached to the external extension bridge 35, a new function can be added so that the receiver can handle a new service.

Figure 10:
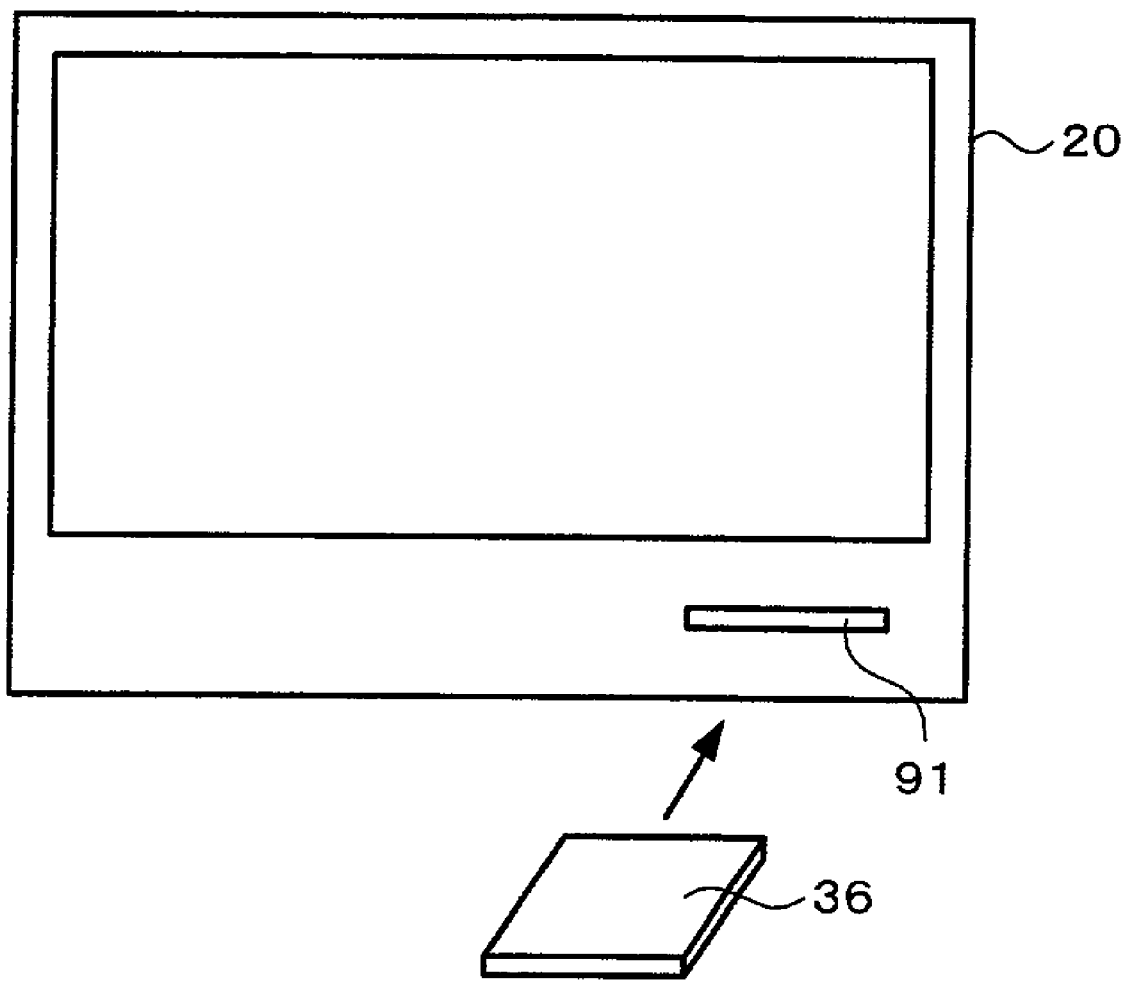
FIG. 10 is a perspective view for explaining the television receiver according to the present invention.

In other words, as shown in FIG. 10, in the television receiver 20 structured as described above, a card attaching portion 91 is disposed on the front of the television receiver 20. The extension plug-in card 36 is attached to the card attaching portion 91. When the extension plug-in card 36 is attached to the card attaching portion 91, the extension plug-in card 36 is connected to the bus 30 through the plug-in interface 35.

When the extension plug-in card 36 is connected to the bus 30 through the plug-in interface 35, a function corresponding to a new service can be extended.

To allow the function of the extension plug-in card 36 that is attached to work, controlling software may be required. The controlling software may be provided as a record medium such as a magnetic disk or an optical disc. The user may install the software to the television receiver. However, in that case, the user should spend time for the installing operation.

Figure 11:
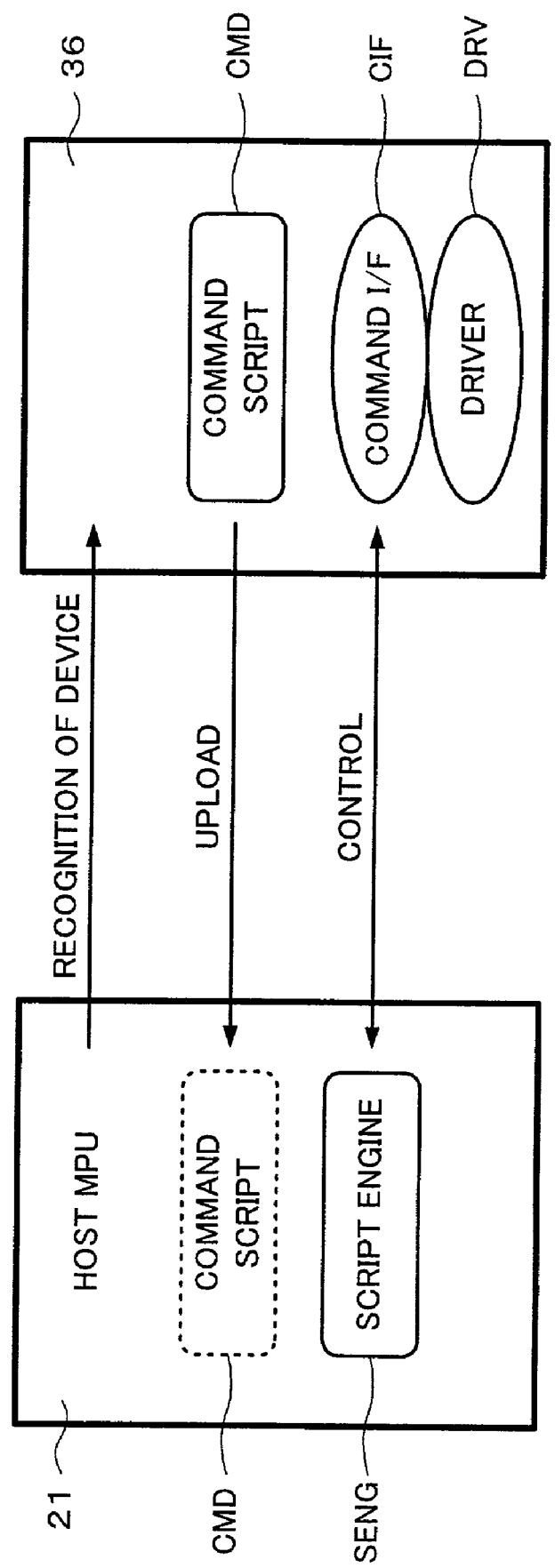
FIG. 11 is a block diagram for explaining the case that an extension plug-in card is attached to the television receiver according to the present invention.

Thus, to prevent that, as shown in FIG. 11, a script is stored in the memory of the extension plug-in card 36. When the extension plug-in card 36 is attached, the script is uploaded to the main memory of the host MPU 21.

In other words, as shown in a conceptual diagram shown in FIG. 11, the extension plug-in card 36 has a command script CMD, a command interface CIF, and a driver DRV. When a new extension plug-in card 36 is attached, the host MPU 21 recognizes that the extension plug-in card 36 has been attached. Thereafter, the command script CMD for causing the extension plug-in card 36 to operate is uploaded to the host CPU 21 side. When the command script CMD is uploaded to the host MPU 21 side, the host MPU 21 side can generate a command for causing the extension plug-in card 36 that has been attached to operate.

When the extension plug-in card 36 is operated, a script engine SENG of the host MPU 21 side generates a command. The command is sent to the extension plug-in card 36 through the bus 30. The command interface CIF of the extension plug-in card 36 interprets the command. The driver DRV controls hardware corresponding to the received command.

Figure 12:
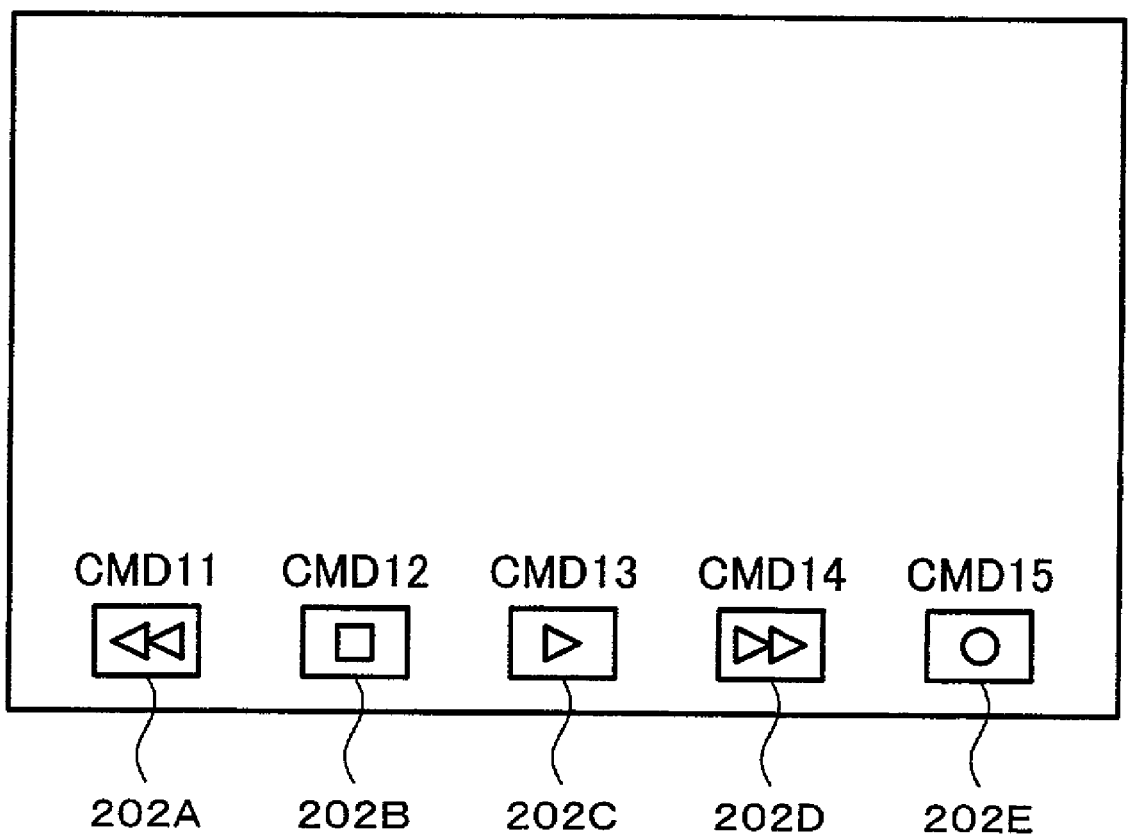
FIG. 12 is a schematic diagram for explaining generations of commands and a display screen in the case that a new device is attached.

When the extension plug-in card 36 is a device that records and reproduces a program, as shown in FIG. 12, a script is described as hypertext that embeds CMD 11, CMD 12, CMD 13, CMD 14, and CMD 15 for rewind, stop, play, fast forward, and record commands corresponding to a rewind key 202A, a stop key 202B, a play key 202C, a fast forward key 202D, and a record key 202E, respectively. When such a script is read, a screen as shown in FIG. 12 is displayed by a browser. When the keys 202A to 202E are clicked, the embedded commands are generated. Corresponding to the commands, the operation of the device is controlled.

Figure 13:
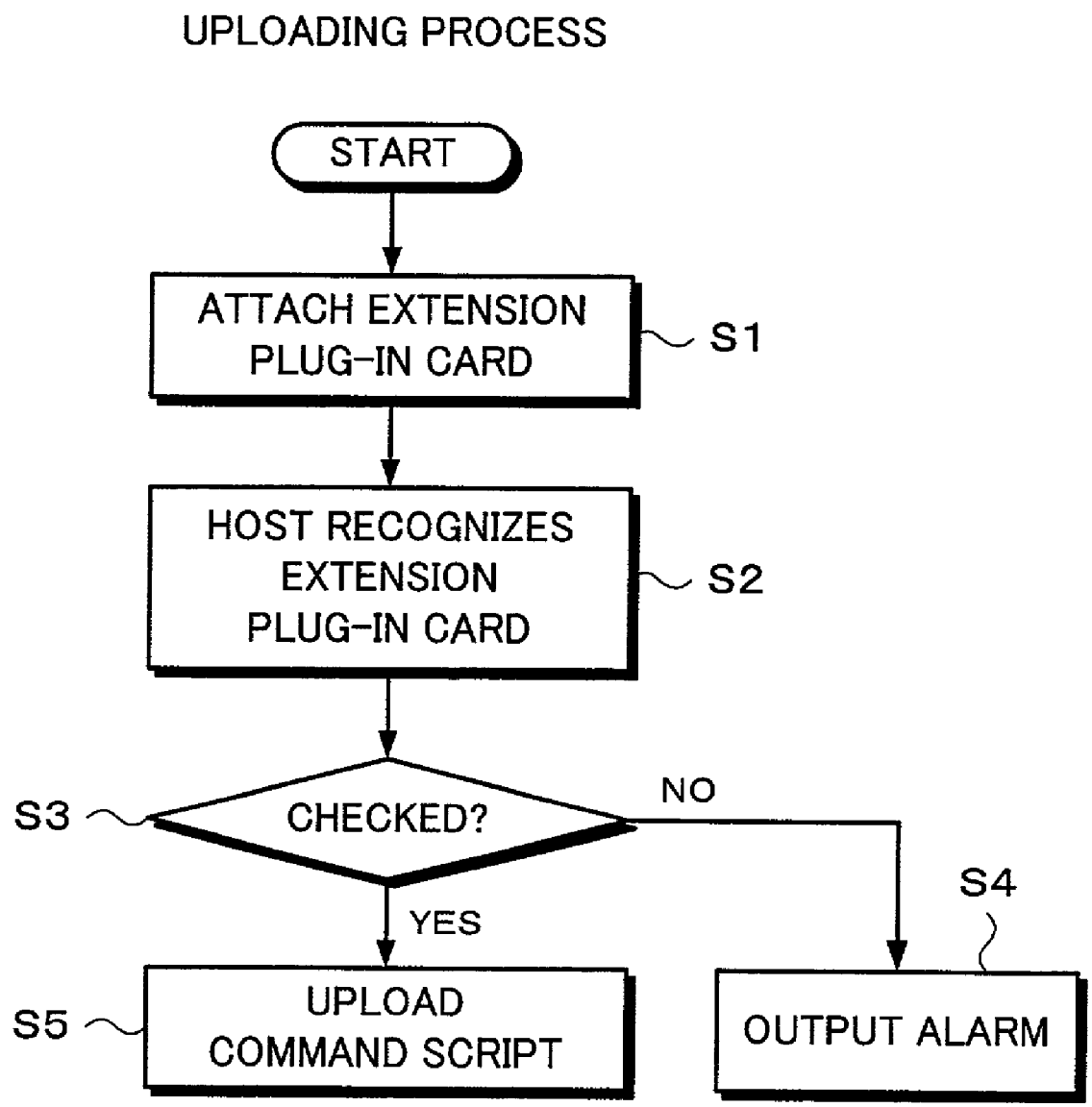
FIG. 13 is a flow chart for explaining the case that the extension plug-in card is attached to the television receiver according to the present invention.
Figure 14:
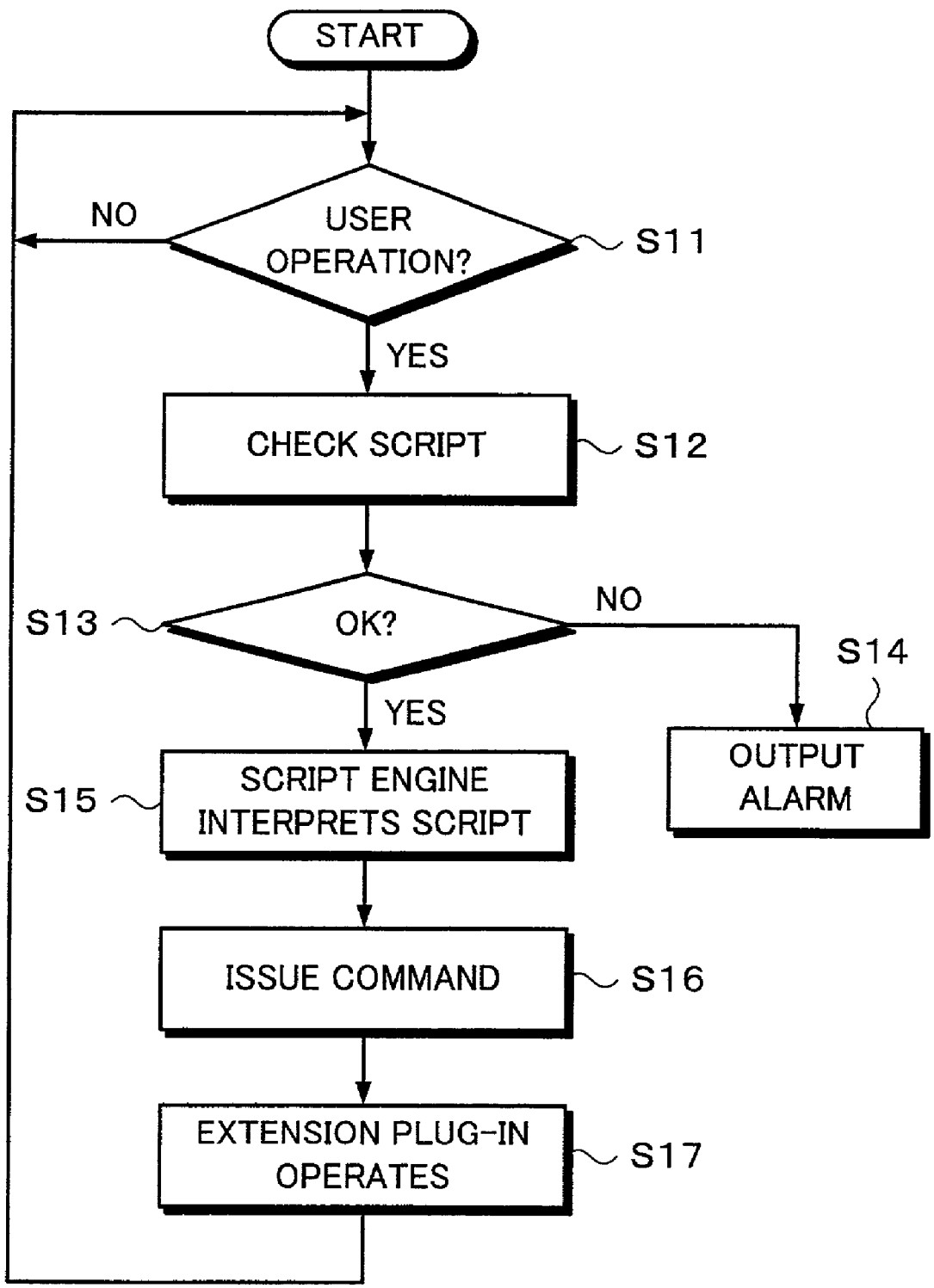
FIG. 14 is a flow chart for explaining the case that the extension plug-in card is attached to the television receiver according to the present invention.

FIG. 13 and FIG. 14 are flow charts showing such a process. In FIG. 13, when the extension plug-in card 36 is attached (at step S1), the host MPU 21 determines that the extension plug-in card 36 has been attached (at step S2). Thereafter, the host MPU 21 determines whether or not the attached card is the extension plug-in card 36 (at step S3). When the determined result of the host MPU 21 represents that the attached card is not the extension plug-in card 36, the host MPU 21 outputs an alarm (at step S4).

When the determined result of the host MPU 21 represents that the attached card is the extension plug-in card 36, the command script CMD stored in the extension plug-in card 36 is uploaded (at step S5). When the command script CMD stored in the extension plug-in card 36 is uploaded, the host MPU 21 recognizes a command for the attached extension plug-in card 36 and performs a process for the attached extension plug-in card 36.

FIG. 14, after the command script has been uploaded, when the use performs an operation for the extension plug-in card 36 (at step S11), the script is checked (at step S12). Thereafter, it is determined whether or not the checked result is correct (at step S13). When the checked result is not correct, an alarm is output (at step S14). When the checked result is correct, the script engine SENG interprets the script (at step S15) and issued a command (at step S16). The extension plug-in device is operated corresponding to the command (at step S17).

In the above example, the case that the new extension plug-in card 36 is attached was described. Likewise, when a new block is added to the bus 30, a command script for the new block can be uploaded in the same manner.

In the above example, a receiver for a digital broadcast was described. The present invention can be also applied to other devices such as a digital VTR.

According to the present invention, elements necessary for a digital television receiver are structured as blocks and connected through a general-purpose bus. Streams of video data and audio data and commands are transferred to the bus. Thus, by replacing only blocks, various types of digital television broadcasts that differ in carrier waves, modulating systems, and compressing systems can be handled. Consequently, the developing efficiency of a television receiver is improved. In addition, when a new service is started, by adding hardware for the service, the service can be easily handled.

INDUSTRIAL APPLICABILITY

As described above, the present invention is particularly suitable for accomplishing a television receiver that receives various types of digital broadcasts that differ in carrier waves, modulating systems, compressing systems, and so forth.

DESCRIPTION OF REFERENCE NUMERALS

10 BUS
11 HOST MPU BLOCK
12 AV SIGNAL PROCESSING BLOCK
13 FRONT END BLOCK
14 INTERFACE BLOCK
15 PLUG-IN INTERFACE BLOCK
16 BUILT-IN FEATURE BLOCK
48, 58, 68, 78, 88 ENCRYPTION ENCODER/DECODER

The invention claimed is:

1. A digital signal processing apparatus, comprising:
a plurality of digital signal processing blocks connected to a common bus, each digital signal processing block including at least a signal processing block for decoding and processing high speed streams of data, each of at least some of said digital signal processing blocks being operative to control hardware associated with said block and having (a) a hardware driver performing a predetermined function assigned to said block for driving the hardware associated with said block and (b) a processing unit for activating said hardware driver to control said associated hardware in response to a high layer command supplied to said processing unit;
a host processing block for controlling said digital processing apparatus by outputting to the processing unit in a respective digital signal processing block said high layer command, said high layer command being independent of the particular structure of the hardware coupled to said digital processing block, said high layer command being free of those functionality instructions that control individual ones of said predetermined functions of the hardware driver in said respective digital signal processing block, said high layer command being a general-purpose script type command that is interpreted by the processing unit in the digital signal processing block to which said high layer command is supplied to perform the function generally described by said high layer command, and said high layer command not being on a real time basis, said high layer command instructing the processing unit in said digital signal processing block to activate said hardware driver of said digital signal processing block to perform the predetermined function assigned to said respective digital signal processing block; and
a common bus for connecting said host processing block and said plurality of digital signal processing blocks together for transferring via said common bus both said high layer command that is not on a real time basis and said high speed streams of data,
wherein said processing unit of each of said digital signal processing blocks interprets and executes said high layer command to produce driver control instructions for said hardware driver to operate said hardware of particular structure associated with said digital signal processing block in accordance with said high layer command.

2. The digital signal processing apparatus as set forth in claim 1,
wherein said plurality of digital signal processing blocks include at least a front end block for processing a received signal of a digital broadcast, and
wherein one of said plurality of digital signal processing blocks is a plug-in interface block for connecting external hardware.

3. The digital signal processing apparatus as set forth in claim 1,
wherein the high layer command is described and embedded in a script of hypertext,
wherein the hypertext is interpreted by a browser and an indication for operating a function is displayed, and
wherein an instruction corresponding to the function is generated.

4. The digital signal processing apparatus as set forth in claim 1,
wherein the high speed streams of data contain video data and/or audio data.

5. The digital signal processing apparatus as set forth in claim 4,
wherein the video data and/or the audio data has been compressed.

6. The digital signal processing apparatus as set forth in claim 1,
wherein said bus is a general-purpose bus, and
wherein blocks can be added to said bus and a substitute for a connected block can be connected to said bus.

7. The digital signal processing apparatus as set forth in claim 6,
wherein when a block is added or substituted, software for operating the added or substituted block is automatically installed.

8. The digital signal processing apparatus as set forth in claim 6,
wherein software for operating the added or substituted block is stored in a memory thereof, and
wherein when the block is added or substituted, the software stored in the memory is installed.

9. The digital signal processing apparatus as set forth in claim 6,
wherein when a block is added or substituted, a service center is accessed through a telephone line, software for operating the added or substituted block is downloaded from the service center through the telephone line, and the downloaded software is installed.

10. The digital signal processing apparatus as set forth in claim 1,
wherein said host processing block has a high level interface for processing said high layer command; and
wherein each said plurality of digital signal processing blocks has a driver for interpreting said high layer command, and a low level interface for controlling said hardware.

11. A digital signal processing method, comprising the steps of:
structuring functions necessary for processing a digital signal as a plurality of digital signal processing blocks and a host processing block, including at least a signal processing block for decoding and processing high speed streams of data, each of at least some of said digital signal processing blocks being operative to control hardware associated with said block by way of a hardware driver therein for driving the hardware associated with said block and having a processing unit for activating said hardware driver to control said associated hardware in response to a high layer command supplied to said processing unit;
connecting the host processing block and the plurality of digital signal processing blocks through a common bus; and
outputting and transferring to the processing unit in a respective digital signal processing block, via said common bus, said high layer command, said high layer command being independent of the particular structure of the hardware coupled to said digital processing block, said high layer command being free of those functionality instructions that activate the hardware driver in said respective digital signal processing block to control the coupled hardware of particular structure, said high layer command being a general-purpose script type command that is interpreted by the processing unit in the digital signal processing block to which said high layer command is supplied to perform the function generally described by said high layer command, and said high layer command not being on a real time basis, said high layer command instructing the processing unit in said digital signal processing block to activate said hardware driver of said digital signal processing block to perform the predetermined function assigned to said respective digital signal processing block and;
supplying to said respective digital signal processing block, over said common bus, a high speed stream of data; and
wherein said processing unit of each of said digital signal processing blocks interprets and executes said high layer command to produce driver control instructions for said hardware driver to operate said hardware of particular structure associated with said digital signal processing block in accordance with said high layer command, and outputs said high speed stream of data.

12. The digital signal processing method as set forth in claim 11,
wherein the plurality of digital signal processing blocks include at least a front end block for processing a received signal of a digital broadcast, and
wherein one of said plurality of digital signal processing blocks is a plug-in interface block for connecting external hardware.

13. The digital signal processing method as set forth in claim 11,
wherein the high layer command is described and embedded in a script of hypertext.

14. The digital signal processing method as set forth in claim 11,
wherein the high speed streams of data contain video data and/or audio data.

15. The digital signal processing method as set forth in claim 14,
wherein the video data and/or the audio data has been compressed.

16. The digital signal processing method as set forth in claim 11,
wherein the bus is a general-purpose bus, and
wherein blocks can be added to said bus and a substitute for a connected block can be connected to said bus.

17. The digital signal processing method as set forth in claim 16,
wherein when a block is added or substituted, software for operating the added or substituted block is automatically installed.

18. The digital signal processing method as set forth in claim 16,
wherein software for operating the added or substituted block is stored in a memory thereof, and
wherein when the block is added or substituted, the software stored in the memory is installed.

19. The digital signal processing method as set forth in claim 16,
wherein when a block is added or substituted, a service center is accessed through a telephone line, software for operating the added or substituted block is downloaded from the service center through the telephone line, and the downloaded software is installed.

* * * * *